US010003737B2

(12) United States Patent
Ishida et al.

(10) Patent No.: US 10,003,737 B2
(45) Date of Patent: Jun. 19, 2018

(54) VIDEO PROCESSING DEVICE, VIDEO PROCESSING METHOD, AND VIDEO PROCESSING PROGRAM

(71) Applicant: Hurray3 Inc., Minato-ku, Tokyo (JP)

(72) Inventors: Mitsugu Ishida, Tokyo (JP); Tadaaki Kamiya, Tokyo (JP); Satoru Aoki, Tokyo (JP)

(73) Assignee: Hurray3 Inc., Tokyo (JP)

( * ) Notice: Subject to any disclaimer, the term of this patent is extended or adjusted under 35 U.S.C. 154(b) by 4 days.

(21) Appl. No.: 15/102,498

(22) PCT Filed: Dec. 10, 2014

(86) PCT No.: PCT/JP2014/082689
§ 371 (c)(1),
(2) Date: Dec. 13, 2016

(87) PCT Pub. No.: WO2015/087915
PCT Pub. Date: Jun. 18, 2015

(65) Prior Publication Data
US 2017/0085786 A1 Mar. 23, 2017

(30) Foreign Application Priority Data
Dec. 10, 2013 (JP) ................. 2013-255379

(51) Int. Cl.
*H04N 5/232* (2006.01)
*G11B 27/034* (2006.01)
(Continued)

(52) U.S. Cl.
CPC ....... *H04N 5/23222* (2013.01); *G11B 27/034* (2013.01); *G11B 27/34* (2013.01);
(Continued)

(58) Field of Classification Search
CPC ...... H04N 5/2322; H04N 5/772; H04N 9/802; H04N 9/8227; G11B 27/34
See application file for complete search history.

(56) References Cited

U.S. PATENT DOCUMENTS

2001/0040592 A1* 11/2001 Foreman .............. G06F 3/0483
715/723
2004/0095474 A1* 5/2004 Matsufune ........... G11B 27/034
348/220.1
(Continued)

FOREIGN PATENT DOCUMENTS

| JP | 2000-48543 | 2/2000 |
|---|---|---|
| JP | 2000-48543 A | 2/2000 |

(Continued)

OTHER PUBLICATIONS

Japanese Office Action for corresponding patent application JP2013-255379, dated Nov. 7, 2016, with Machine Translation.

*Primary Examiner* — Mishawn Hunter
(74) *Attorney, Agent, or Firm* — Typha IP LLC

(57) ABSTRACT

Provided is a video processing apparatus including: shooting template storage unit that stores shooting templates for individual themes available for a video work, the shooting templates indicating compositions and shoot times of individual scenes available for the video work; scene selecting unit that displays, upon selection of any one of the shooting templates for the individual themes stored in the shooting template storage unit, a list of scenes for the selected shooting template and receives a selection of scenes for commencement of shooting; scene shooting unit that displays, upon selection of the scenes through the scene selecting unit, a shooting screen with guide information on the screen, and shoots the selected scenes lasting for the shoot times defined by the shooting template, the guide information serving as a guide for the compositions defined by the shooting template; and video work completing unit that completes the video work by compiling videos for the respective selected scenes shot by the scene shooting unit. This facilitates making of story movies.

6 Claims, 7 Drawing Sheets

(51) Int. Cl.
*G11B 27/34* (2006.01)
*H04N 5/77* (2006.01)
*H04N 9/802* (2006.01)
*H04N 9/82* (2006.01)

(52) U.S. Cl.
CPC ......... *H04N 5/23254* (2013.01); *H04N 5/772* (2013.01); *H04N 9/802* (2013.01); *H04N 9/8227* (2013.01)

(56) References Cited

U.S. PATENT DOCUMENTS

| | | | | |
|---|---|---|---|---|
| 2004/0260669 | A1* | 12/2004 | Fernandez | G06F 17/30017 |
| 2008/0215979 | A1 | 9/2008 | Clifton et al. | |
| 2009/0295932 | A1* | 12/2009 | Ichii | H04N 5/2252 |
| | | | | 348/220.1 |
| 2011/0221916 | A1* | 9/2011 | Kuriyama | H04N 5/23216 |
| | | | | 348/220.1 |
| 2012/0070124 | A1* | 3/2012 | Tokunaga | H04N 5/772 |
| | | | | 386/224 |
| 2012/0095817 | A1* | 4/2012 | Kamil | G06Q 30/0241 |
| | | | | 705/14.4 |
| 2012/0304066 | A1 | 11/2012 | Brodersen et al. | |
| 2013/0047081 | A1* | 2/2013 | Long | G06F 3/0488 |
| | | | | 715/705 |
| 2013/0117671 | A1* | 5/2013 | Long | G06F 3/0488 |
| | | | | 715/725 |

FOREIGN PATENT DOCUMENTS

| | | |
|---|---|---|
| JP | 2006-74406 | 3/2006 |
| JP | 2006-93795 | 4/2006 |
| JP | 2007-166250 | 6/2007 |
| JP | 2013-90267 A | 10/2011 |
| JP | 2013-90267 | 5/2013 |
| JP | 2013-162178 | 8/2013 |

\* cited by examiner

Fig. 2B
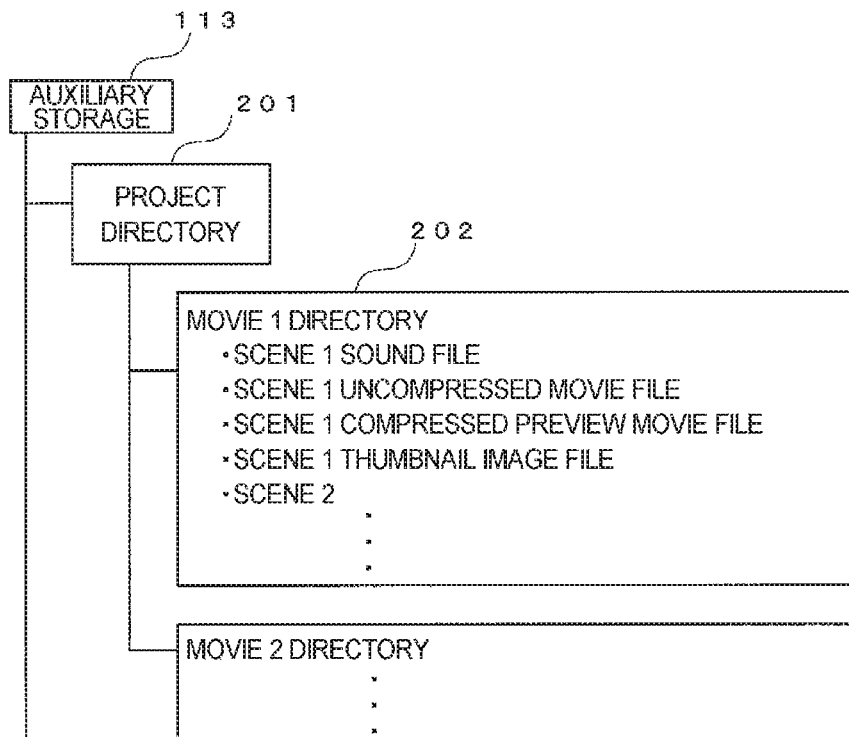
*Movies are managed separately on a scene basis.
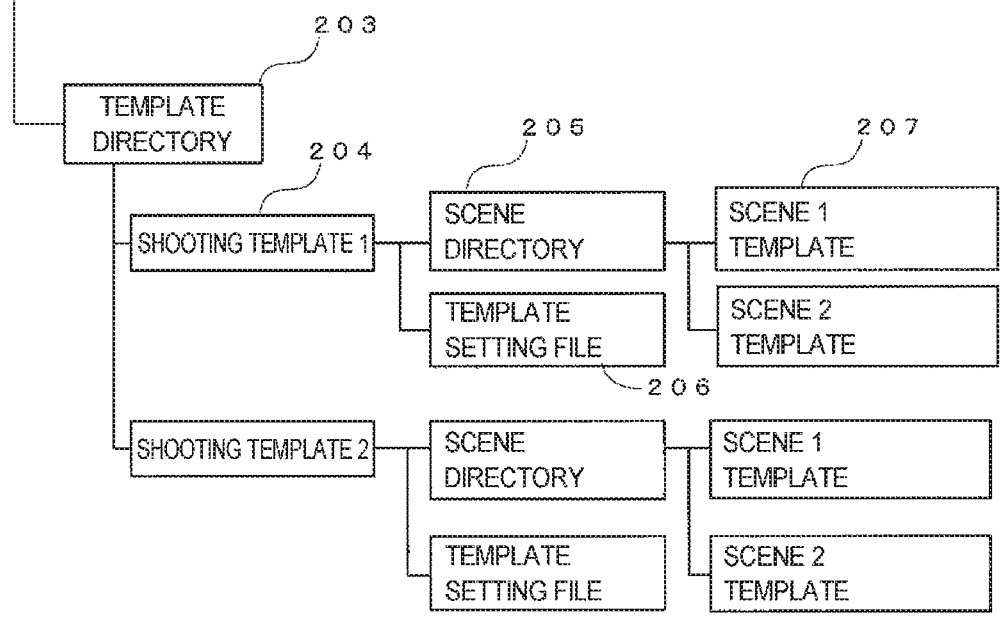
*Scenes and storyboards are managed on a template basis.

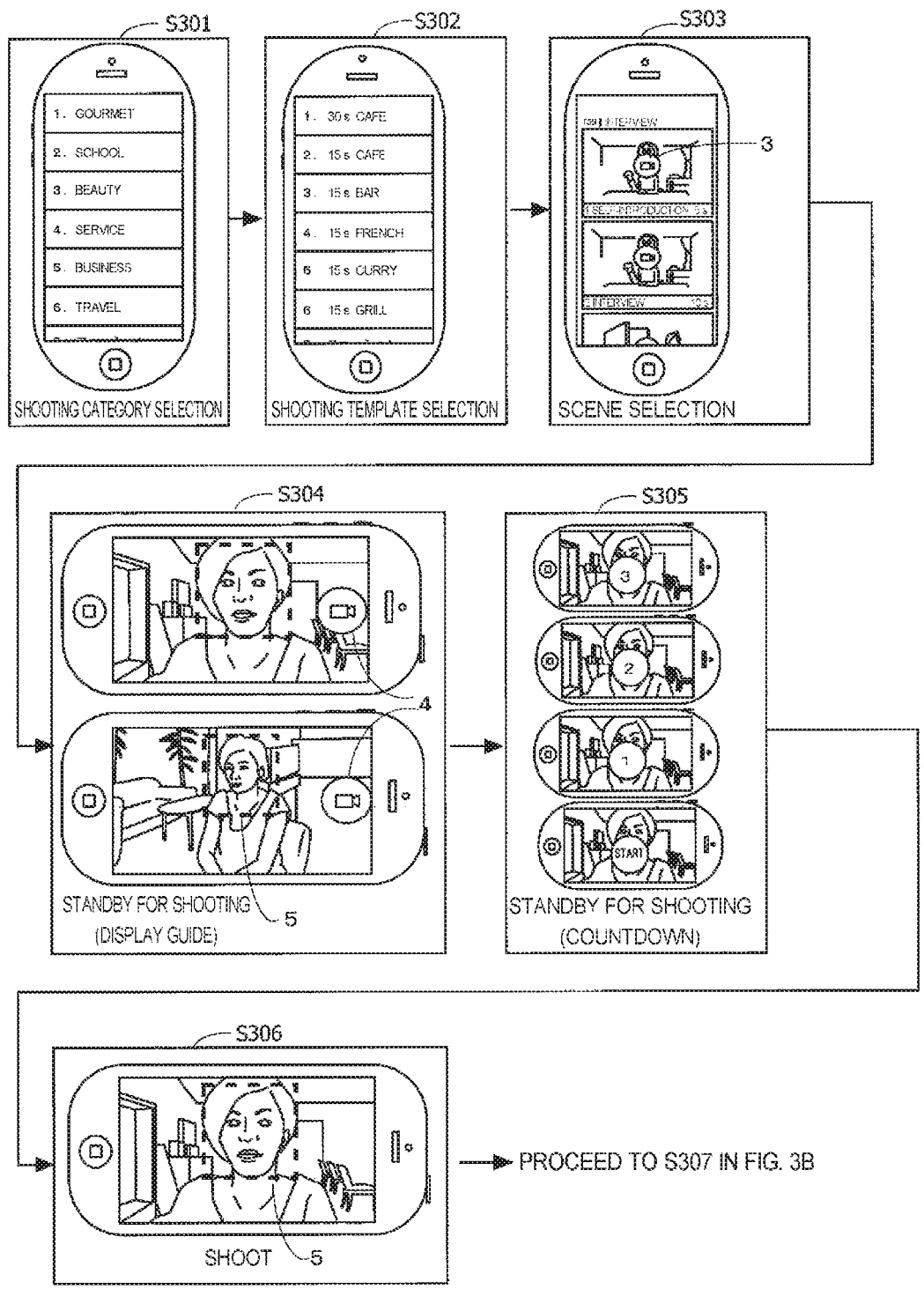

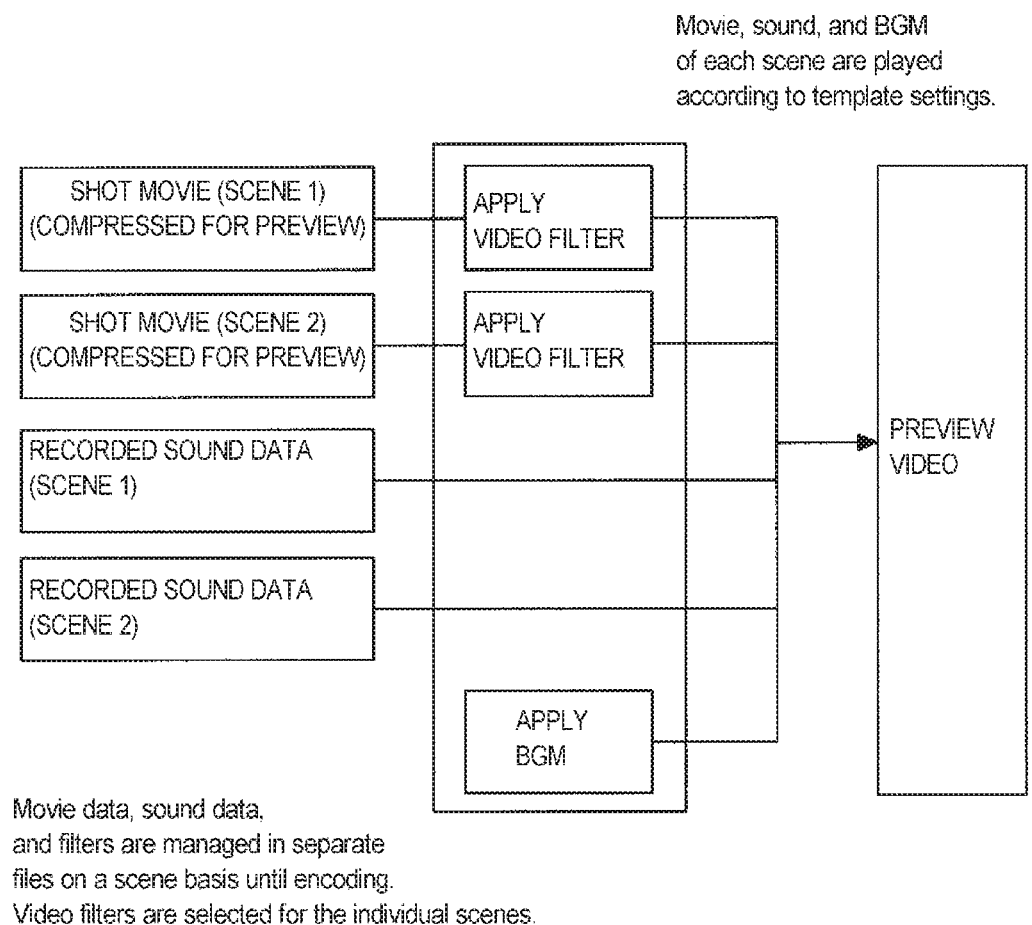

VIDEO PROCESSING DEVICE, VIDEO PROCESSING METHOD, AND VIDEO PROCESSING PROGRAM

BACKGROUND OF THE INVENTION

Field of the Invention

The present invention relates to a video processing apparatus, a video processing method, and a video processing program.

Description of the Related Art

In recent years, movies have been used in various fields. For example, various companies use commercial movies to promote their products. These commercial movies are run through TVs, for example. Movie sharing services have also been recently provided on the Internet. In movie-sharing services, published are movies made by not only companies but individuals. A technique is also proposed to create one movie work by combining a shot movie and music on a computer (see U.S. Patent application publication Nos. 2012/0304066 and 2008/0215979).

Making story movies, such as commercial movies, films, short movies, TV dramas, and learning materials consisting of movies, often requires advanced techniques for filming and editing. Story movies are therefore made by, for example, directors, cameramen, lighting assistants, editors, producers, and other professional engineers in various fields. Besides, filming and editing each scene often requires a large number of man-hours. Moreover, filming and editing story movies often use expensive equipment. Making story movies therefore requires a long period of time and a big budget in many cases. Medium-sized companies and individuals can hardly secure a budget and a number of staffs needed to make such story movies.

SUMMARY OF THE INVENTION

The present invention, which has been made to solve this problem, discloses a video processing apparatus including: shooting template storage unit that stores shooting templates for individual themes available for a video work, the shooting templates indicating compositions and shoot times of individual scenes available for the video work; scene selecting unit that displays, upon selection of any one of the shooting templates for the individual themes stored in the shooting template storage unit, a list of scenes for the selected shooting template and receives a selection of scenes for commencement of shooting; scene shooting unit that displays, upon selection of the scenes through the scene selecting unit, a shooting screen with guide information on the screen, and shoots the selected scenes lasting for the shoot times defined by the shooting template, the guide information serving as a guide for the compositions defined by the shooting template; and video work completing unit that completes the video work by compiling videos for the respective selected scenes shot by the scene shooting unit.

In this video processing apparatus, scenes suitable for the individual themes available for the video work are prepared in each shooting templates. Each shooting template indicates the composition and shoot time of each scene. With scene-by-scene shooting according to the shooting template, story movies can be made without an editing process.

The technique disclosed in the invention may have the following aspect: a video processing method including: a scene selecting step of displaying, upon selection of any one of shooting templates that are prepared for individual themes available for a video work, indicate compositions and shoot times of individual scenes available for the video work, and are stored in shooting template storage unit, a list of scenes for the selected shooting template, and receiving a selection of scenes for commencement of shooting; a scene shooting step of displaying, upon selection of the scenes in the scene selecting step, a shooting screen with guide information on the screen, and shooting the selected scenes lasting for the shoot times defined by the shooting template, the guide information serving as a guide for the compositions defined by the shooting template; and a video work completing step of completing the video work by compiling videos for the respective selected scenes shot in the scene shooting step.

The technique disclosed in the invention may have the following aspect: a video processing program causing a computer to perform: a scene selecting step of displaying, upon selection of any one of shooting templates that are prepared for individual themes available for a video work, indicate compositions and shoot times of individual scenes available for the video work, and are stored in shooting template storage unit, a list of scenes for the selected shooting template, and receiving a selection of scenes for commencement of shooting; a scene shooting step of displaying, upon selection of the scenes in the scene selecting step, a shooting screen with guide information on the screen, and shooting the selected scenes lasting for the shoot times defined by the shooting template, the guide information serving as a guide for the compositions defined by the shooting template; and a video work completing step of completing the video work by compiling videos for the respective selected scenes shot in the scene shooting step.

A technique provided by the invention allows a movie to be shot according to a shooting template, thereby making a story movie without an editing process.

BRIEF DESCRIPTION OF THE DRAWINGS

FIG. 2B illustrates stored data in an auxiliary storage in Embodiment 1;

FIG. 3A illustrates the first half of a flow chart of a process of making a movie according to Embodiment 1;

FIG. 4 illustrates a process for generating a preview video in a video processing apparatus 110 according to Embodiment 1.

DETAILED DESCRIPTION OF THE PREFERRED EMBODIMENT

Figure 1:
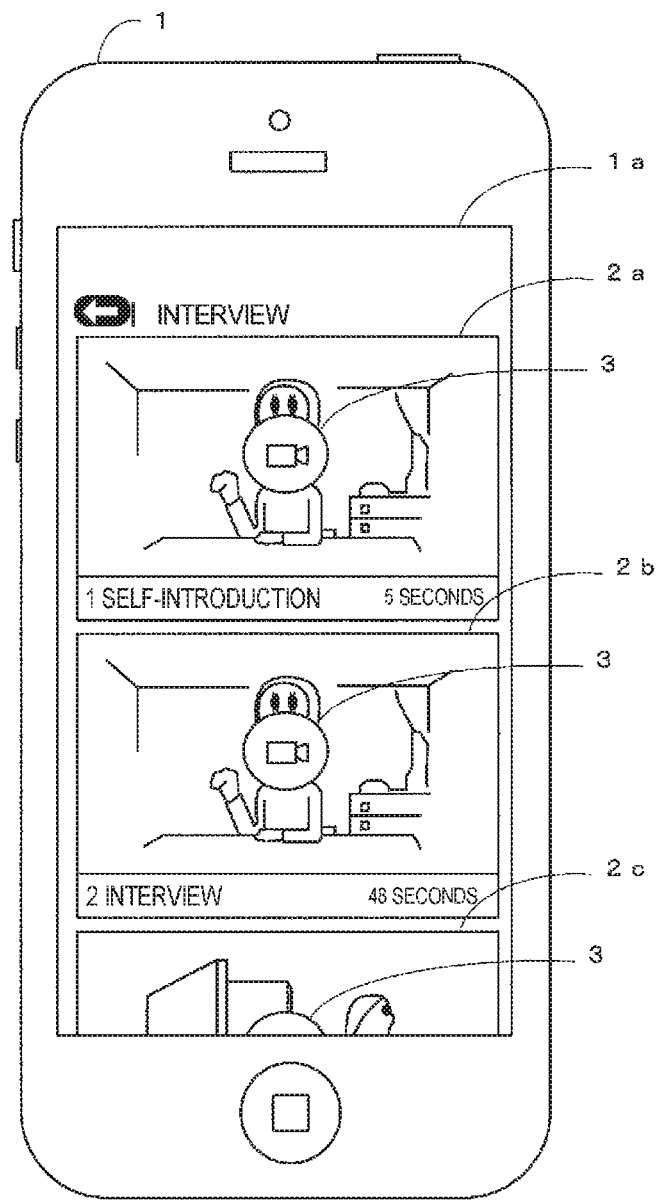
FIG. 1 illustrates a screen for selecting a scene in Embodiment 1.

An embodiment of the present invention will now be described with reference to the drawings. The embodiment below is to be taken as illustrative only and do not limit the technical scope of the invention.

Embodiment 1

One aspect of the present invention is illustrated as a video processing apparatus. Embodiment 1 illustrates a video processing apparatus that makes a commercial movie according to a shooting template. In Embodiment 1, the commercial movie is shot scene by scene. Examples of scenes include "opening", "explanation of the product to promote", and "ending". Embodiment 1 illustrates making of a commercial movie with a smartphone used as a video processing apparatus. Embodiment 1 includes a movie shooting application working on the smartphone. Embodiment 1 will be described below with reference to FIGS. 1, 2A, 2B, 3A, 3B, 4 and 5.

A process will be first roughly explained for making a video work with a video processing apparatus according to Embodiment 1. The video processing apparatus according to Embodiment 1 performs shooting to make the video work based on a shooting template, which is among templates provided according to themes for video works. The shooting templates include guide information indicating the composition of each scene, and information indicating the shoot time of each scene. Movie shooting is performed on a scene basis. Examples of scenes are "opening", "interview", and "ending". While shooting each scene, the video processing apparatus according to Embodiment 1 may display a guide frame on the screen to show the composition. After shooting all the scenes, the video processing apparatus according to Embodiment 1 performs rendering to complete the video work.

The shooting templates include information on the composition and shoot time of each scene. The shooting templates are prepared for individual themes available for video works. The shooting templates may include information on a guide frame that shows the position of the subject while shooting each scene. The shooting templates may also include storyboard information illustrating the composition of each scene. The shooting templates may also include explanation of the details of each scene. With the shooting templates, the videographer can readily grasp the composition and the shoot time during shooting.

The video processing apparatus according to Embodiment 1 may provide a plurality of shooting templates. The shooting templates are prepared for, for example, individual types of business. Examples of shooting templates include "cafe" (30 seconds), "bar" (15 seconds), and "Italian" (15 seconds), where the shoot time of each shooting template is shown in parentheses. A shooting template for one type of business includes information on the composition and shoot time of each scene suitable for that type of business. For example, upon selection of "cafe" (30 seconds) as a shooting template, "opening" (2 seconds), "interview to the manager" (10 seconds), "overall view of the shop" (5 seconds), "explanation of the product" (6 seconds), "interview to the guest" (5 seconds), and "ending" (2 seconds) are selected as scenes. Upon selection of the shooting template, the composition and shoot time of each scene suitable for that type of business are shown.

The video processing apparatus according to Embodiment 1 may provide shoot categories each containing a plurality of shooting templates. Examples of shoot categories include "gourmet", "school", "service", and "business". Grouping shoot themes to shoot categories facilitates selection of an appropriate shooting template from many shooting templates.

FIG. 1 illustrates a screen for selecting a scene in Embodiment 1. FIG. 1 illustrates a smartphone 1 as a video processing apparatus. The smartphone 1 has a display 1a showing scene selection screens 2a to 2c. The scene selection screens 2a to 2c may show a storyboard indicating the compositions of the scenes. The scene selection screens 2a to 2c show scene selection buttons 3 to receive a command to start shooting. Touching each scene selection buttons 3 initiates shooting of the corresponding scene.

Figure 2A:
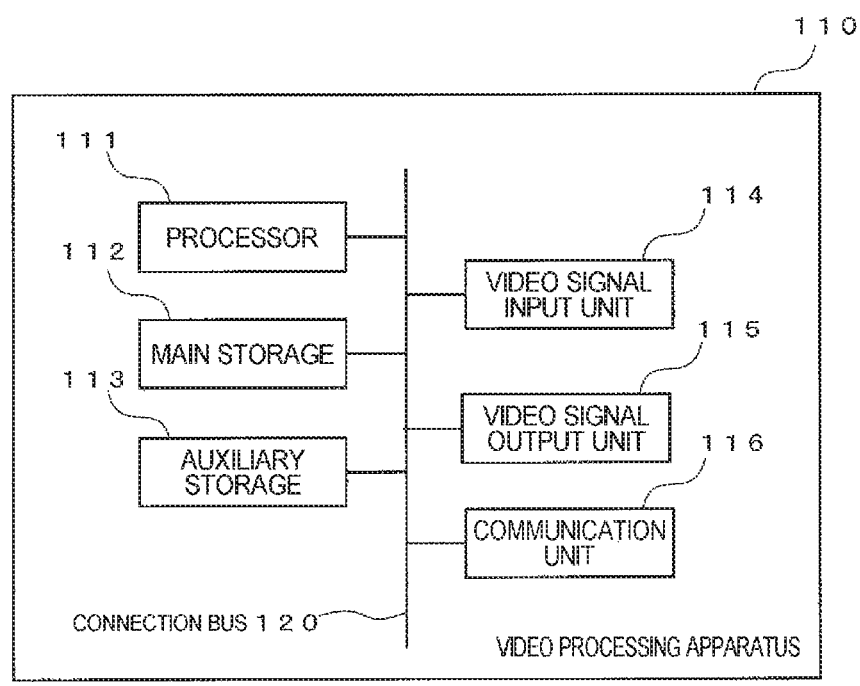
FIG. 2A illustrates a hardware structure of a video processing apparatus.

FIG. 2A illustrates a hardware structure of a video processing apparatus 110. FIGS. 2A and 2B illustrate the video processing apparatus 110 of a type in common use, including a processor 111, a main storage 112, an auxiliary storage 113, a video signal input unit 114, a video signal output unit 115, and a communication unit 116, which are connected to one another via a connection bus 120. The video processing apparatus 110 is, for example, a smartphone, tablet terminal, cellular phone, personal computer, digital camera, digital video camera, or wearable device such as a glasses-like computer or a watch-like computer. The smartphone 1 is one example of the video processing apparatus 110.

In the video processing apparatus 110, the processor 111 decompresses programs stored in the auxiliary storage 113 into a work area in the main storage 112 so that they can be executable, and controls the peripherals by executing the programs. Thus, the video processing apparatus 110 implements functional unit suitable for predetermined objects. The main storage 112 and the auxiliary storage 113 are storage media readable by the video processing apparatus 110.

The processor 111 executes the decompressed executable programs in the main storage 112. Consequently, the video processing apparatus 110 operates as the video processing apparatus according to Embodiment 1. The main storage 112 is illustrated as a storage directly accessed by the processor 111. The main storage 112 includes a RAM (random access memory) and a ROM (read only memory).

The auxiliary storage 113 stores various programs and data in a recording medium in readable/writable formats. The auxiliary storage 113 is also referred to as "external storage device". The auxiliary storage 113 stores an OS (operating system), various programs, various tables, and other data. The OS includes a communication interface program to receive/transmit data from/to external devices connected to the video processing apparatus 110 via the communication unit 116. Examples of external devices include video processing apparatuses and external storage devices connected to the video processing apparatus 110 via, for example, a network. The auxiliary storage 113 may be part of a cloud which is a group of computers on a network.

The auxiliary storage 113 is, for example, an EPROM (erasable programmable ROM), SSD (solid state disk), or HDD (hard disc drive). Alternatively, the auxiliary storage 113 is, for example, a compact disc (CD) drive, digital versatile disc (DVD) drive, or Blu-ray (registered trademark) Disc (BD) drive. The auxiliary storage 113 may be provided via a network attached storage (NAS) or storage area network (SAN). The recording medium is, for example, a silicon disc including a nonvolatile semiconductor memory (flash memory), hard disc, CD, DVD, BD, or universal serial bus (USB) memory.

The video signal input unit 114 receives input video signals from a camera or other shooting devices. The input video signals are stored in the auxiliary storage 113 as needed. The video processing apparatus 110 is connected to a camera or other shooting devices via the video signal input unit 114 by a wired or wireless connection. The video processing apparatus 110 may include a camera or other shooting devices.

The video signal output unit 115 outputs information received from the video processing apparatus 110 to a display or other display apparatuses. For example, the video processing apparatus 110 outputs video signals resulting from the shooting via the video signal output unit 115 and display them on the display. The video processing apparatus 110 may be connected to a display or other display apparatuses via the video signal output unit 115 by a wired or wireless connection. The video processing apparatus 110 may include a display or other display apparatuses.

The communication unit 116 is, for example, an interface with a network. Examples of the network include wired core networks, Internet, LANs (local area network), InfiniBand, dedicated buses provided by computer makers, and wireless LANs and other wireless networks. The communication unit 116 communicates with external devices by a wired or wireless connection. The video processing apparatus 110 may upload, for example, a shot movie to external devices through the communication unit 116. The video processing apparatus 110 may also download, for example, shooting templates and other information from external devices.

The video processing apparatus 110 may include an input unit that receives, for example, commands from the user. The input unit may be a keyboard, a pointing device, a touch panel, a controller with an acceleration sensor or infrared sensor, a voice input device, or other input devices. The video processing apparatus 110 may also include an output unit that outputs data processed in the processor 111 and data stored in the main storage 112. The output apparatus may be a CRT (cathode ray tube) display, an LCD (liquid crystal display), a PDP (plasma display panel), an EL (electroluminescent) panel, an organic EL panel, a printer, or other output devices.

FIG. 2B illustrates various stored information in the auxiliary storage 113 in Embodiment 1. FIG. 2B illustrates a project directory 201, which stores movies, and a template directory 203, which stores shooting templates.

The project directory 201 includes movie directories 202 into which stored movies are classified by video work. Each movie directory 202 contains movie and sound files related to the respective scenes. A video taken for each scene may be divided into a movie file and a sound file for storage. Each movie directory 202 may also include thumbnail images. The movie file for each scene may contain a compressed preview movie file.

The template directory 203 may store information on templates. The template directory 203 contains shooting template directories 204. The shooting template directory 204 is prepared for each theme of a video work. Each shooting template directory 204 contains a scene directory 205 and a template setting file 206. The template directory is one example of shooting template storage unit.

Each template setting file 206 contains template setting information. Template setting information contains, for example, a template ID for uniquely identifying a shooting template, the name of the template, the shoot time of each scene, and IDs for identifying scenes in the shooting template, scene allocation information for determining to which time range of the video work each scene is allocated, and flag information for determining the presence or absence of the sound of each scene to output.

Each scene directory 205 contains scene templates 207 for individual scenes making up a video work. Each scene template 207 contains information on the composition and shoot time for the corresponding scene. Each scene is Opening, Interview, Ending, or other scenes.

The template directory 203 may contain shooting category directories (not shown in the drawing) containing a plurality of shooting template directories 204. Classifying the shooting template directories 204 into the shooting category directories facilitates selection of a target shooting template even from a large number of shooting templates.

The project directory 201 and the template directory 203 are not necessarily stored in the auxiliary storage 113. For example, the project directory 201 and the template directory 203 may be stored in a server on a network. In this case, the video processing apparatus 110 accesses the server on the network through the communication unit 116.

Figure 3B:
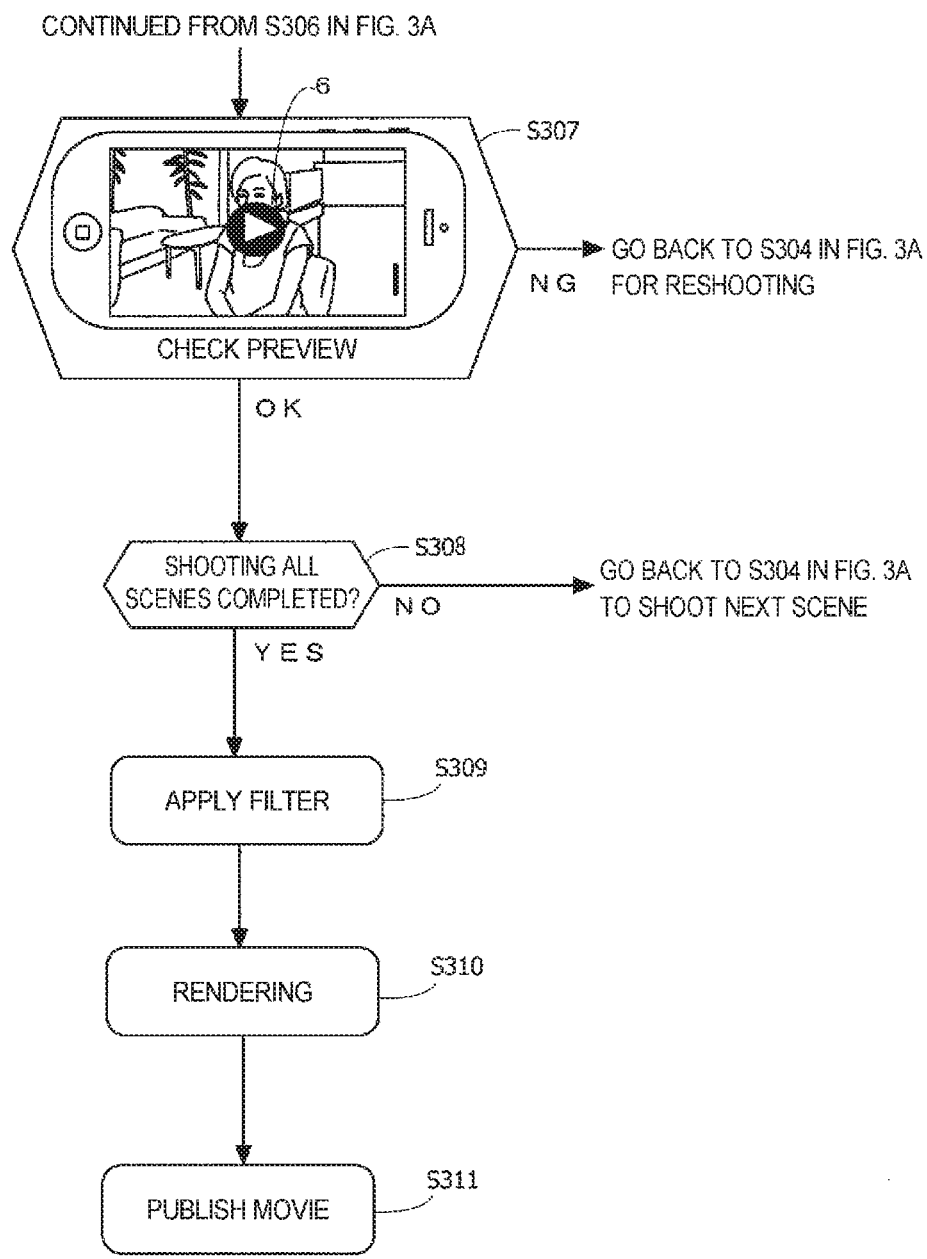
FIG. 3B illustrates the last half of the flow chart of the process of making a movie according to Embodiment 1.

FIG. 3A illustrates the first half of a flow chart of a process of making a movie according to Embodiment 1. FIG. 3B illustrates the last half of the flow chart of the process of making a movie according to Embodiment 1. FIGS. 3A and 3B show exemplary screens appropriately displayed on the smartphone 1. Referring to FIGS. 3A and 3B, the process of making a video work according to Embodiment 1 will be explained below.

Upon initiation, the smartphone 1 reads shooting category information from the template directory 203 in the auxiliary storage 113. The read shooting category information is displayed on the display 1*a* of the smartphone 1 as a shooting category selection screen. A shooting category is gourmet, school, beauty, service, business, and travel, or other categories. Here, gourmet, for example, is selected as a shooting category.

Upon selection of a shooting category, the smartphone 1 reads a list of shooting templates in the selected shooting category from the auxiliary storage 113. Information on the read shooting template is displayed on the display 1*a* of the smartphone 1 as a shooting template selection screen. A shooting template is prepared for each theme of the video work. The shooting templates are, for example, Cafe (30 seconds), Bar (15 seconds), and Italian (15 seconds). Here, Cafe (30 seconds), for example, is selected as a shooting template (S302).

Upon selection of a shooting template, the smartphone 1 reads a list of scenes in the selected shooting template from the auxiliary storage 113. The smartphone 1 then shows a selection screen for the read scene on its display 1*a* (S303). Each scene is "opening", "interview", "in-shop shooting", "ending", or other scenes. Each scene includes guide information on the shoot time and the composition. The Step S303 is one example of scene selecting unit.

Upon selection of a scene, the smartphone 1 displays a guide frame 5 and a shooting start button 4 on the display 1*a* (S304). The upper drawing in S304 shows a composition for shooting a close-up portrait movie, and the lower drawing shows a composition including the background. The guide frame 5 is, for example, guide information indicating that composition and a shooting target for the scene. Guide information includes, for example, a guide frame displayed as a guide for the position of the subject. Examples of the subject include humans, products to promote, furniture, and buildings. Guide information may include displayed description of the shooting target. In addition, the smartphone 1 may show a storyboard showing compositions to be shot, on the display 1*a* as guide information. The storyboard may be displayed in perspective view on the entire display 1*a* of the smartphone 1. The smartphone 1 may also show a barometer of the volume on the display 1*a*. Showing a barometer of the volume promotes the videographer to check an appropriate volume before shooting.

Touching the shooting start button 4 may cause the smartphone 1 to show countdown to the start of shooting on the display 1*a* (S305). The countdown is shown, for example, as "3", "2", "1", and then "START".

Upon completion of the countdown, the smartphone 1 starts shooting the selected scene (S306). During shooting, the smartphone 1 may show guide information, e.g., the guide frame 5 and the description of a target to be shot, in the display 1*a*. Showing guide information during shooting facilitates maintaining an appropriate composition during shooting. During shooting, the smartphone 1 may also show a barometer of the volume on the display 1*a*. Showing a barometer of the volume facilitates checking if the volume is appropriate during shooting. Shooting lasts for a shoot time determined by the shooting template for each scene. The smartphone 1 subjects the shot movie to classification by scene and stores it in the auxiliary storage 113. After shooting the scene, the smartphone 1 may generate a compressed preview movie file. The step S306 is one example of scene shooting unit.

After shooting, the smartphone 1 shows a preview of the shot video on the display 1a (S307). The process of generating a preview will be explained later. After presentation of the preview, the smartphone 1 may show a dialog for promoting the videographer to check if there is no problem with the previewed video. If there is no problem with the previewed video, the process in the smartphone 1 proceeds to S308. If there are any problems with the previewed video, the process in the smartphone 1 proceeds to S304.

The smartphone 1 determines if shooting of all the scenes is completed (S308). If shooting of all the scenes is completed, the process in the smartphone 1 proceeds to S309. If shooting of not all the scenes is completed, the process in the smartphone 1 proceeds to S304.

After shooting all the scenes, the smartphone 1 shows a screen for selecting a filter to be applied to each scene (S309). A filter is applied, for example, to each scene. Upon selection of a filter to be applied to each scene, the system of Embodiment 1 applies the filters to the respective scenes. Filter application refers to, for example, a process for giving various effects to the shot movies. Examples of filters include color modification, "transition" for decorating the transition from one scene to another scene, sound effects, and BGM (back ground music).

After filter application, the smartphone 1 performs rendering for the shot movies (S310). This rendering compiles the movies shot for the respective scenes and the filters applied to the respective scenes into one commercial movie file. The step S310 is one example of video work completing unit.

After completion of the rendering, the completed movie is ready to be published (S311). The smartphone 1 may upload the created commercial movie to, for example, an external movie-sharing service, an SNS (social networking service), or an E-commerce website, through the communication unit 116. The smartphone 1 may encode the commercial movie in the image quality, file format, file size, and other properties suitable for the destination to upload the movie, such as a movie-sharing service.

FIG. 4 illustrates a process for generating a preview video in the smartphone 1. The preview video is generated using, for example, compressed preview movie files stored in the auxiliary storage 113. The filters applied to the respective scenes are applied to the compressed preview movie files. The BGM for the preview videos is determined by the template setting files 206. The preview video is generated by merging a movie file of the corresponding scene with a filter applied thereto, a sound file of that scene, and the BGM determined by the template setting file. The smartphone 1 may separately store the movie files, sound files, and filter information for the respective scenes in the auxiliary storage 113 until the encoding.

Figure 5:
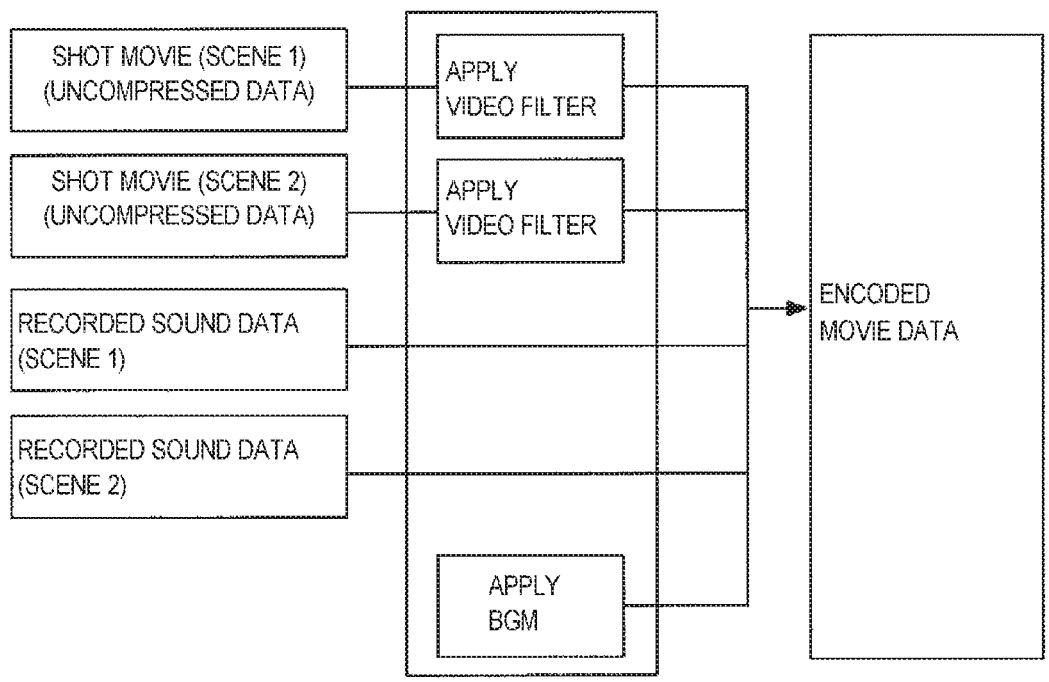
FIG. 5 illustrates a process for encoding in the video processing apparatus 110 according to Embodiment 1.

FIG. 5 illustrates a process for encoding in the smartphone 1. Encoding is the same process as generation of a preview video except that it uses uncompressed data. The explanation thereof will be therefore omitted.

In Embodiment 1, a commercial movie is shot scene by scene according to a shooting template. This enables a story commercial movie to be made without an editing process.
<Modification>
In Embodiment 1, the commercial movie was shot with the smartphone. This Modification illustrates a digital camera as the video processing apparatus 110 to shoot a family event by using a movie shooting function of the digital camera.

In order to shoot a family event, "family" is selected as a shooting category. Upon selection of "family" as a shooting category, the system of Modification reads a list of shooting templates in the shooting category of "family" from the auxiliary storage 113. Examples of shooting templates for "family" include "new year", "birthday", "wedding", and "family trip". A screen for selecting from the read shooting templates is presented on the display of the digital camera. Here, "birthday", for example, is selected as a shooting template.

Upon selection of "birthday" as a shooting template, the system of Modification reads a list of scenes in the shooting template of "birthday" from the auxiliary storage 113. Examples of scenes for "birthday" include "opening" (2 seconds), "room overview" (4 seconds), "close-up cake" (2 seconds), "birthday party scene" (30 seconds), "present scene" (20 seconds), and "ending" (2 seconds). The list of the read scenes is presented on the display of the digital camera as a screen for selecting a scene. The process after the presentation of the screen for selecting a shooting template is similar to S304 to S311 and the explanation thereof will be therefore omitted.

In Modification, the family event is shot according to a shooting template. This enables a story movie to be shot without an editing process.
<Download of shooting Template>
Shooting templates described in Embodiment 1 and Modification may be downloaded from, for example, a server on a network through the communication unit 116. A downloaded shooting template may be stored in the auxiliary storage 113. If the download of shooting templates is possible, shooting templates other than those in the auxiliary storage 113 of the smartphone 1 at default setting are additionally available.

For Embodiment 1 and Modification described above, modifications can be made without departing from the scope of the invention. For example, Embodiment 1 involves selection from a plurality of categories and templates but may alternatively have a single type of template. To be specific, the video processing apparatus 110 with only one template of "cafe" (30 seconds) may be dedicated to make commercial movies for cafes. For another example, Embodiment 1 and Modification employ a smart phone or digital camera to shoot movies, although these are not only devices to shoot movies in the present invention. The present invention is applicable to, for example, any device that receives input video signals and can record the received video signals. The present invention is therefore applicable to, for example, digital video cameras, personal computers connected to web cameras, and cellular phones and tablet terminals having a movie shooting function.

In the present invention, different shooting templates are prepared for different genres, so that various genres of movies can be made. Examples of different genres of movies include movies showing cooking recipes, movies showing technical tips, and e-learning contents. A created movie may be uploaded to a movie-sharing service suitable for its genre. Examples of movie-sharing services include E-commerce websites, cooking recipe-sharing websites, gourmet-searching websites, and e-learning websites.
<Recording Medium Readable By Computer>
A program that causes a computer or other machines and devices (hereinafter referred to as "computers, etc.") to implement any one of the above-described functions can be stored in a recording medium readable by computers, etc. The function can be provided when a computer, etc. read and execute the program in the recording medium.

A recording medium readable by computers, etc. including video processing apparatuses refers to a recording medium that stores information, such as data or programs, through electric, magnetic, optical, mechanic, or chemical action and is readable by computers, etc. Examples of, among such recording media, recording media removable from computers, etc. include flexible discs, magneto-optical discs, CD-ROMs, CD-R/Ws, DVDs, Blu-ray Discs, DATs, 8 mm tapes, and flash memory and other memory cards. In addition, examples of recording media fixed to computers, etc. include hard disk drives and ROMs.

What is claimed is:

1. A video processing apparatus comprising:
   shooting template storage unit that stores shooting templates for individual themes available for a video work, the shooting templates indicating compositions and shoot times of individual scenes available for the video work;
   scene selecting unit that displays, upon selection of any one of the shooting templates for the individual themes stored in the shooting template storage unit, a list of scenes for the selected shooting template and receives a selection of scenes for commencement of shooting;
   scene shooting unit that displays, upon selection of the scenes through the scene selecting unit, a shooting screen with guide information on the screen, and shoots the selected scenes lasting for the shoot times defined by the shooting template, the guide information serving as a guide for the compositions defined by the shooting template; and
   video work completing unit that completes the video work by compiling videos for the respective selected scenes shot by the scene shooting unit, wherein
   the scene shooting unit displays, while shooting the selected scene, guide frames as the guide information disposed on the screen, each guide frame serving as a guide for a position of a subject, and
   the scene shooting unit further displays, upon selection of the scenes by the scene selecting unit, a shooting standby screen showing the guide information and shooting start buttons on the screen, starts shooting of the selected scenes when the shooting start button is touched, and performs the shooting of the selected scenes for the shoot times defined by the shooting template for the respective selected scenes.

2. The video processing apparatus according to claim 1, wherein the shooting template storage unit stores shooting categories each including a plurality of the shooting templates.

3. The video processing apparatus according to claim 1, wherein the scene shooting unit during the shooting of the selected scenes displays the guide frames on the shooting screen, does not display buttons to receive commands from a videographer on the shooting screen, and terminates the shooting of the selected scenes after lapses of the shooting times.

4. The video processing apparatus according to claim 1, wherein the scene shooting unit further displays description of shooting guides on the screen as the guide information while shooting the selected scenes.

5. A video processing method comprising:
   displaying, upon selection of any one of shooting templates that are prepared for individual themes available for a video work, indicate compositions and shoot times of individual scenes available for the video work, and are stored in shooting template storage unit, a list of scenes for the selected shooting template and receiving a selection of scenes for commencement of shooting;
   displaying, upon selection of the scenes, a shooting screen with guide information on the screen, and shooting the selected scenes lasting for the shoot times defined by the shooting template, the guide information serving as a guide for the compositions defined by the shooting template; and
   completing the video work by compiling videos for the respective shot scenes, wherein
   the shooting of the selected scene involves displaying, while the selected scene is shot, guide frames as the guide information disposed on the screen, each guide frame serving as a guide for a position of a subject, and
   the shooting of the selected scene further involves displaying, upon selection of the scenes, a shooting standby screen showing the guide information and shooting start buttons on the screen, starting the shooting of the selected scenes when the shooting start button is touched, and performing the shooting of the selected scenes for the shoot times defined by the shooting template for the respective selected scenes.

6. A non-transitory recording medium readable by a computer that stores a program causing the computer to perform:
   displaying, upon selection of any one of shooting templates that are prepared for individual themes available for a video work, indicate compositions and shoot times of individual scenes available for the video work, and are stored in shooting template storage unit, a list of scenes for the selected shooting template and receiving a selection of scenes for commencement of shooting;
   displaying, upon selection of the scenes, a shooting screen with guide information on the screen, and shooting the selected scenes lasting for the shoot times defined by the shooting template, the guide information serving as a guide for the composition defined by the shooting template; and
   completing the video work by compiling videos for the respective shot scenes, wherein
   the shooting of the selected scene involves displaying, while the selected scene is shot, guide frames as the guide information disposed on the screen, each guide frame serving as a guide for a position of a subject, and
   the shooting of the selected scene further involves displaying, upon selection of the scenes, a shooting standby screen showing the guide information and shooting start buttons on the screen, starting shooting of the selected scenes when the shooting start button is touched, and performing the shooting of the selected scenes for the shoot times defined by the shooting template for the respective selected scenes.

* * * * *